United States Patent [19]

Lubkin, deceased

[11] 3,786,422
[45] Jan. 15, 1974

[54] SYSTEM FOR DETERMINATION OF DEVIATIONS OF A VEHICLE FROM A PRESCRIBED ROUTE

[75] Inventor: Samuel Lubkin, deceased, late of Lauderdale Lake, Fla. by Frances Lubkin, administratrix

[73] Assignee: Rel-Reeves Inc., Boynton Beach, Fla.

[22] Filed: Jan. 31, 1973

[21] Appl. No.: 328,930

[52] U.S. Cl.................. 340/149 R, 340/53, 340/63, 346/8
[51] Int. Cl............................................ B60r 25/00
[58] Field of Search..................... 340/149 R, 53, 63; 343/7; 346/8; 46/244 D

[56] References Cited
UNITED STATES PATENTS
3,113,306  12/1963  Gardner.......................... 340/149 R
3,650,097  3/1972  Nokes............................... 46/244 D
3,665,386  5/1972  Dosch................................ 346/8 X Primary Examiner—Donald J. Yusko
Attorney—Edward H. Loveman

[57] ABSTRACT

A system for determining deviations of a vehicle from a prescribed route on a tape advanced in steps through scanning means in a tape reader to generate first data signals representing prescribed turning points in the route. A heading means has associated photoelectric means to generate second data signals representing angular changes in heading of the vehicle and a odometer has associated switch means for generating third data signals representing distances travelled between turns and around turns. Digital logic circuitry receptive to the first, second and third data signals includes digital counting, register and decoding means for comparing the second and third data signals with the first data signals and for generating signals indicative of coincidence and noncoincidence of the compared signals.

10 Claims, 6 Drawing Figures

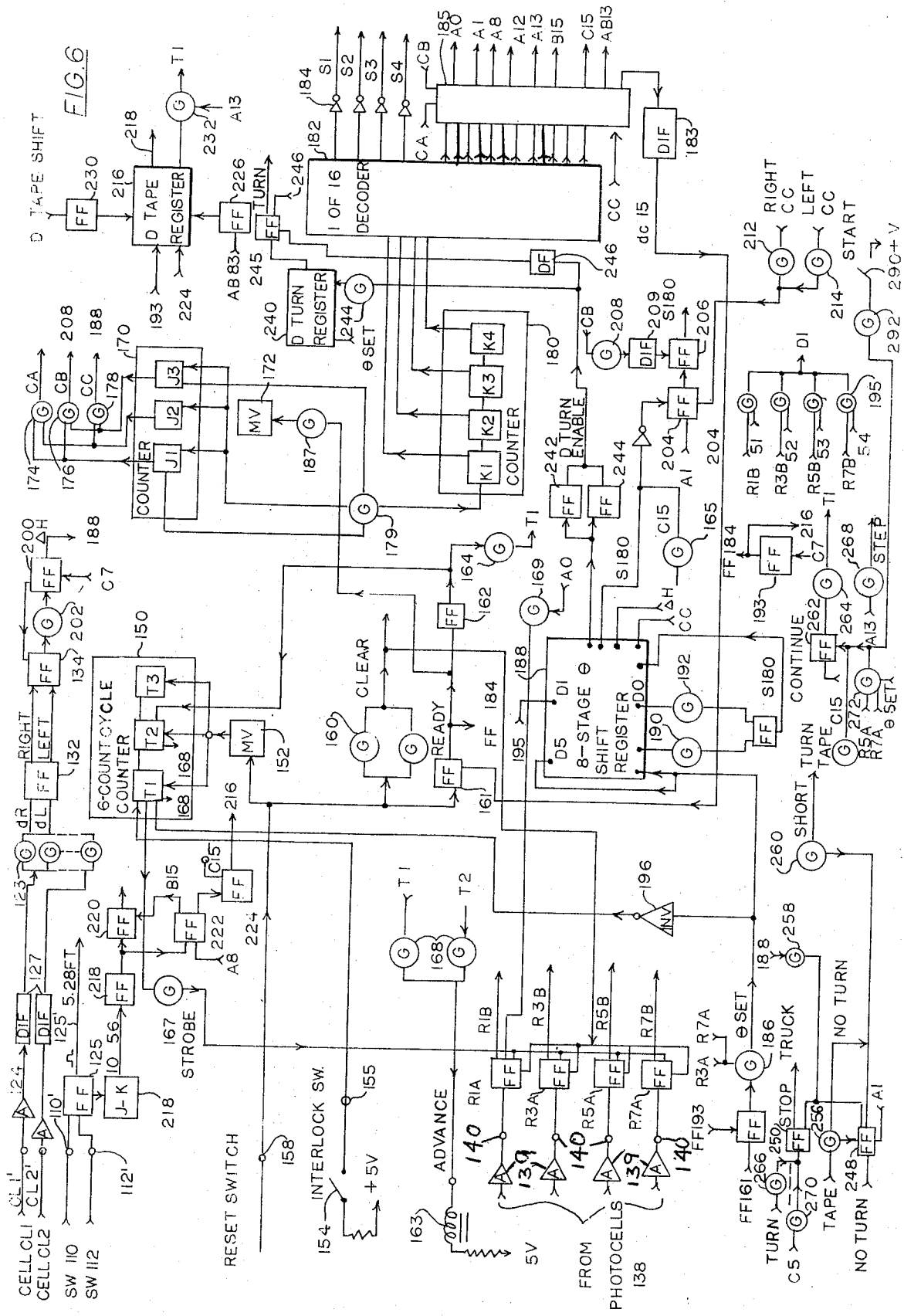

SYSTEM FOR DETERMINATION OF DEVIATIONS OF A VEHICLE FROM A PRESCRIBED ROUTE

This invention relates to an anti-hijack system for vehicles, and more particularly concerns a system for monitoring the route traveled by a vehicle, for comparing key points in the route traveled with a preprogrammed route, and for providing signals usable to disable the vehicle and to actuate an alarm if the route traveled differs materially from the preprogrammed route at any of the key ponts.

It has been proposed heretofore to provide a self-contained system on a vehicle such as a truck traveling along a prescribed route which will disable the truck automatically in the event the truck deviates laterally beyond certain allowable limits from the prescribed route. The route to be traveled was preprogrammed on the tape which was run continuously through a tape reader installed in the truck. Monitoring means in the system detected lateral deviations of the truck from the preprogrammed route or from key elements of the route program and actuate alarm and truck disabling means automatically.

The prior system employed analog logic means to effect comparison of the actual route traveled with the preprogrammed route. This equipment was quite costly and bulky and had rather large power requirements. It had one inherent disadvantage which precluded its use on fairly long routes. This was the tendency to accumulate errors which were unavoidable. Errors due to wheel slippage and wear, zig-zagging while driving, road slopes, map errors, etc. continued to build up until the monitoring equipment was unable to distinguish travel on the prescribed route from deviations off the route.

The present invention is directed at overcoming the above and other difficulties and disadvantages inherent in prior route monitoring systems, and at providing an improved monitoring system with novel features. The improved system employs a circuit which may be miniaturized on a printed circuit board and employs digital logic rather than analog logic which thereby increases accuracy, reduces cost, power requirements and size. A most important feature is the use of a limited set of discrete program steps to describe salient features of a prescribed path. The equipment effects comparison of the actual route traveled only at turning points. Errors in travel which accumulate between turning points are automatically cancelled out at each turning point. The equipment "sees" the vehicle leaving each correct turning point as if it were beginning a new route with no accumulated error to contend with. This arrangement makes it possible to travel long distances along a prescribed route with no error build-up carried forward from one turning point to the next. The improved system ignores minor deviations of travel of the vehicle from the prescribed route between programmed turning points. These desirable advantages are accomplished with simplified heading and distance determination facilities. The control tape bearing the prescribed route program can be relatively short as compared with one used in a system monitoring a route continuously at all points. The improved system employs bias in turning angle determination so as to standardize the method of measuring deviations and providing wide tolerances in such measurement.

It is therefore a principal object of the present invention to provide a system for monitoring the actual route traveled by a vehicle by comparing the actual route with an ideal, prescribed route, wherein turning points are the principal points of comparison.

A further object of the present invention is to provide a system as described wherein route errors accumulated between vehicle turning points are cancelled out of the system at each turning point so that the comparison starts anew with zero error after each turning point.

Another object of the present invention is to provide a system as described employing digital logic means to effect comparison between the prescribed and actual route. Yet another object of the present invention is to provide simplified means for measuring distance traveled around a turn and for measuring heading.

These and other objects and many of the attendant advantages of this invention will be readily appreciated as the same becomes better understood by reference to the following detailed description when considered in connection with the accompanying drawings in which:

FIG. 6 is a functional block diagram showing essential portions of the system logic according to the invention.

Figure 1:
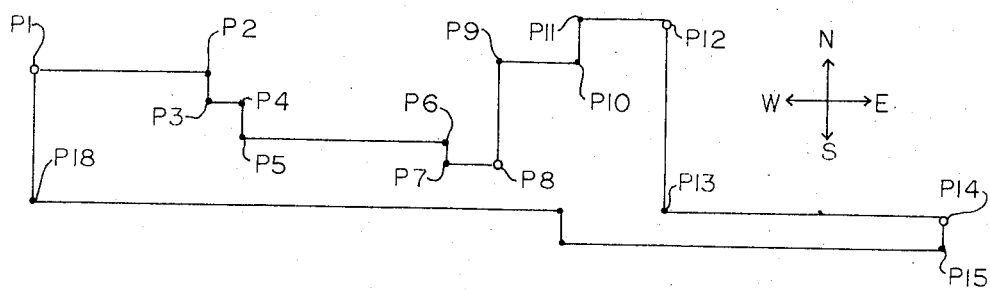
FIG. 1 is a route diagram employed in explaining principles of the invention.

Referring now to the drawings wherein like reference characters designate like or corresponding parts throughout, there is illustrated in FIG. 1, P1 represents the starting point of a vehicle from a loading station. The vehicle is required to travel east to point P2, south to point P3, east to point P4, south to point P5, east to point P6, south to point P7, then east to point P8 which is designated as a "drop point," where the vehicle may stay for unloading. Then the vehicle is required to go north to point P9, east to point P10, north to point P11 and east to a second "drop point" P12. After unloading, the vehicle is required to go south to point P 13 and east to point P14 which is a third "drop point." After unloading, the vehicle leaves point P14 and is required to travel south to P15, then west to point P16, north to point P17, west to point 18 and finally north to point P1 which is the end of the route. At each of the points P2-P18 the vehicle is required to change its direction of travel and turn in another direction. The system virtually ignores distance errors accrued between points whether closely spaced like points P14–P15 or P16–P17 or much longer as between points P1–P-2, P5–P6, P12–P13, etc.

Figure 2:
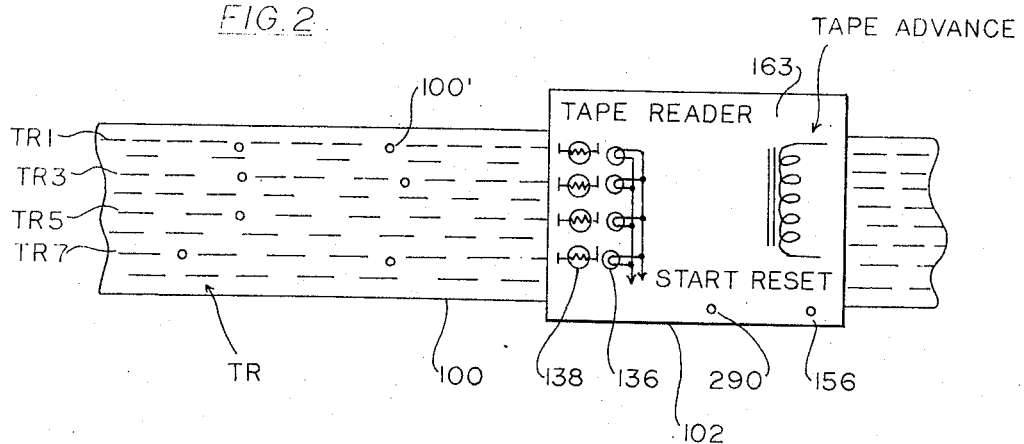
FIG. 2 is a diagram of a punched tape reader and tape such as employed in the system.

The particular program functions available are as follows:

1. End of Route
2. $\theta$ Set Right
3. $\theta$ Set Left
4. Any Turn
5. Drop Point
6. No Turn 7. Short Turn Right
8. Short Turn Left
9. Long Turn Right
10. Long Turn Left Each program step includes, in addition to the designated function, a numerical quantity, except for the last step which uses an End of Route function. For the two $\theta$ Set functions, this numerical quantity represents the magnitude of an angle. For the remaining functions, the numerical quantity represents a distance. In the selected arrangement, the function and associated numerical quantity are coded into four hole positions on four tracks across a program tape 100 shown in FIG. 2. Angles are coded in multiples of 2.8125° 90°/(=32) and distances in multiples of 168.96 feet 1 mile/(=32). Since a 4-hole code can represent a total of 16 quantities, angles up to 45° and distances up to 2703.36 feet can be coded. Larger angles are never required but larger distances may well be needed and in such a case, the same function and additional distances are repeated, with the desired programmed distance being the sum of the successive coded values for the same function.

The function, END OF ROUTE, represents the satisfactory conclusion of the controlled portion of the path and is the last program step. There is no further check of vehicle motion when this function is reached.

The functions, $\theta$ SET RIGHT and $\theta$ SET LEFT, are utilized to reset previously accumulated values of heading angles and to bias subsequent angle changes to improve turn determinations. Because of the particular method of implementing some of the operations, it is mandatory to precede every programmed TURN function with a $\theta$ SET step and to follow every programmed TURN or DROP POINT function with a $\theta$ SET step if unnecessary otherwise.

The function, ANY TURN, means that the vehicle may be driven for the specified distance over any path, straight or curved or with sharp right or left turns as desired. This function may be used when the vehicle is on a road that, over the specified distance, has no turn-off. It may also be used when the portion of path traversed cannot be coded accurately for some reason.

DROP POINT similarly permits any type of motion over the specified distance but differs from ANY TURN in that the distance is an allowed maximum and the function terminates when the driver presses a "START" button. If this button is not pressed prior to traverse of the specified distance, this constitutes an error in following the programmed route. The DROP POINT function is used to cover vehicle motion within a loading or unloading area. The START button is to be pressed upon leaving such area and resuming a known path.

NO TURN specifies that, for the designated distance, the vehicle is to proceed essentially along a straight path in the direction it is heading initially. However, deviations of up to 45° in either direction (after applying the bias specified by a preceding $\theta$ SET) are allowable; as is even greater heading changes if not maintained to accumulate turn distances above 169 feet.

The SHORT TURN RIGHT function states that, within the designated distance the vehicle will turn right, moving at least 169 feet with a heading angle between 45° and 135° (after bias by the preceding $\theta$ SET). This program step ends when the 169 feet off path is detected before the specified distance has been covered. If this 169 feet is not detected prior to traverse of the given distance or if 169 feet is accumulated with a heading angle between −45° and −135° (a short left turn), an error in following the prescribed path is indicated.

The SHORT TURN LEFT is similar but with change in the signs of the angle. The LONG TURN RIGHT and LONG TURN LEFT functions are similar but the turn distance accumulation must be 338 feet instead of 169 feet. The primary reason for providing two variations for turns is to avoid critical conditions in which the path has portions which are close to meeting the conditions of one of the turn distances so that slight errors in measurement makes the determination indefinite. The particular distances were chosen primarily because they are small enough compared to the lengths of city blocks.

The implementation of turns is such that distances within the angle range −45° and −135° subtract from distances traversed with heading in the range of 45° to 135°. This tends to cancel out short turns, even if at sharp angles, around obstacles in the path. An alternative, still within the scope of this invention, is to obtain the perpendicular distance off initial direction (with bias, if desired) by multiplying each distance increment by the sine of the heading angle (or a stepwise approximation thereto) and summing with due regard to sign. The selected implementations can be considered in this fashion as approximating the sine of an angle by a constant when the angle is between 45° and 135°.

One special condition during a NO TURN program step is also treated as an error. This is the making of a "U" turn, even if of sufficiently small radius as not to be detected as a turn. If, during the NO TURN step, an angle is reached between 135° and 225°, an error is indicated.

The punched paper tape 100 (FIG. 2) is utilized to record the control program. Both function and associated quantity are recorded in one tape track. For convenience of transmission and to simplify the construction of a tape reader 102, the tape 100 contains eight tracks designated TR, but only the odd numbered tracks or channels TR1, TR3, TR5 and TR7 are actually read. The particular codes selected are as follows:

| TAPE HOLES TR-7531 | FUNCTION | DISTANCE (ft) | ANGLES IN DEGREES RIGHT | LEFT |
|---|---|---|---|---|
| 0000 | — | 168.96 | 42.1875 | 45.0000 |
| 000 | — | 337.92 | 39.3850 | 42.1875 |
| 00 0 | Any Turn | 506.88 | 36.5625 | 39.3850 |
| 00 | No Turn | 675.84 | 33.7500 | 36.5625 |
| 0 00 | $\theta$ Set Left | 844.80 | 30.9375 | 33.7500 |
| 0 0 | $\theta$ Set Right | 1013.76 | 27.1250 | 30.9375 |
| 0 | End of Route | 1182.74 | 25.3125 | 27.1250 |
| 0 | — | 1351.68 | 22.5000 | 25.3125 |
| 000 | — | 1520.64 | 19.6875 | 22.5000 |
| 00 | — | 1689.60 | 16.8750 | 19.6875 |
| 0 0 | Long Turn Left | 1858.56 | 14.0625 | 16.8750 |
| 0 | Long Turn Right | 2027.52 | 11.2500 | 14.0625 |
| 00 | Short Turn Left | 2196.48 | 8.4375 | 11.2500 |
| 0 | Short Turn Right | 2365.44 | 5.6250 | 8.4375 |
| 0 | Drop Point | 2534.40 | 2.8125 | 5.6250 |
| | — | 2703.36 | 0.0000 | 2.8125 |

In the following detailed description of the system reference will be made to FIG. 6 where certain conventions have been observed in representing certain components, for example:

Generally, a multivibrator designated MV, are comprised of two transistors cross coupled via capacitors whereby each transistor acts as a relaxation oscillator for a period determined by the product of the respective size of the coupling capacitor and the collector resistance. Gates indicated by the symbol G in a circle are generally "nand" gates, and have one output and two, three or four inputs. The output is logic 0 when all inputs are at logic 1 and at all other times the output is at logic 1. Flip-flops are indicated by the designation FF in a rectangle and are generally of the conventional J–K type with each having a "set" input, a "clock" input, and two outputs. When a "set" input is at logic 0, the adjacent output line is at logic 1, and the other output is at logic 0. When the "set" input is at logic 1, the outputs stay at whatever logic levels they were previously set unless the "clock" input changes from logic 1 to logic 0. It should be noted that some of the inputs and outputs in FIG. 6 have been omitted where their function is not pertinent to the invention.

A pair of counters 150 and 170 employ J–K flip-flops as binary counters of the conventional "Johnson" type, whereas a Counter 180 employs J–K flip-flops as binary counters of the conventional "ripple" type. In the counters 150 and 170 several J–K flip-flops are connected so that each output controls the next J–K flip-flop except that the outputs of the last flip-flop controls the first flip-flop in an opposite fashion. For example, in the Counter 150, three J–K flip-flops T1, T2 and T3 are employed, producing the following six successive outputs with a change of driving "clock" repeatedly between logic 0 and 1 levels and with "set" inputs at a logic 1 throughout.

| Step | T3 | T2 | T1 |
|---|---|---|---|
| 1 | 0 | 0 | 1 |
| 2 | 0 | 1 | 1 |
| 3 | 1 | 1 | 1 |
| 4 | 1 | 1 | 0 |
| 5 | 1 | 0 | 0 |
| 6 | 0 | 0 | 0 | and repeat.

In the "ripple" type of counter, each J–K flip-flop is steered by its own outputs in reverse order so that the flip-flop inverts whenever the "clock" input changes from logic 1 to logic 0. Where more than one stage is used the output of each is used as the "clock" input to the next and thus each successive stage shifts half as often as the preceding stage, i.e., the four-stage counter 180 repeats only after 16 steps.

A 1 of 16 decoder 182 has four inputs and 16 outputs with the inputs driven by the ripple counter 180. All outputs except one are at logic 1. The output with logic 0 depends upon the input code and shifts from one output terminal to the next sequentially as the input code goes through the complete cycle of 16 combinations.

An eight-stage shift register 188 has three inputs DS, DI and DO, two outputs, and a reset input. When one control input is at logic 0 and the other changes from logic 0 to logic 1, the register 188 shifts data stored from each bit position to the next. The outputs represent the data stored in the last register state. When input DS is at logic 0 the signal at input DO enters the first stage of the register during shift. When input DS is at logic 1 the signal at input DI enters the first stage instead of DC. When the reset input is at logic 0 all stages change to logic 0.

An inverter is indicated by the designation INV in a triangle and has a single input and a single output. Logically the output is the inverse of the input and thus when the input is at logic 1 the output is at logic 0 and vice versa.

A differentiator circuit is represented by a symbol DIF in a rectangle, and is generally comprised of a capacitor followed by a pull up resistor which may be paralleled by a clamp diode. The DIF circuit output is normally at logic 1 but momentarily goes to logic 0 when the input signal to the capacitor is changed from logic 1 to logic 0. The circuit functions conventionally to change a relatively long-term signal to an initial short pulse.

Figure 3:
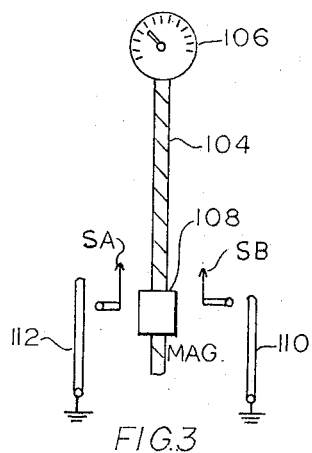
FIG. 3 is a diagram of an odometer and associated magnetically operated switches installed in the vehicle monitored by the present improved system.

In the present system, distances are measured by counting rotations of a cable 104 of an odometer 106 installed in the vehicle being monitored (FIG. 3). Each rotation of the cable 104 denotes nominally 5.28 feet (1/1000 mile). A magnet 108 rotating with the cable 104 alternately actuates one of two magnetic reed switches 110, 112. One terminal of each of the switches 110 and 112 is grounded and the other terminal is connected to the respective points 110' and 112' (FIG. 6). A flip-flop 125 is connected to the points 110' and 112' and is set and reset alternately producing an approximate square pulse at an output 125' for every 5.28 feet of vehicle movement, as indicated in FIG. 6. The distance determination is not exact and will not agree exactly with distances programmed on the tape 100 because of map errors, wheel slippage, wheel wear, zig-zagging while driving, road slopes, etc. Such accumulated errors are corrected in accordance with the invention during program turns whose end position is fairly well defined by the relatively short distance around the turn defining its completion. The distance specified within which a turn must be completed takes into account all accumulated tolerances.

Figure 4:
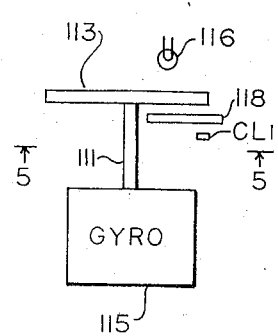
FIG. 4 is a diagrammatic top view of a gyroscope and associated parts employed for making azimuth measurements.
Figure 5:
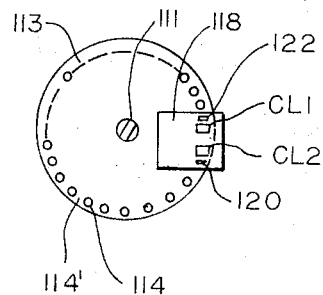
FIG. 5 is a diagrammatic vertical view taken along line 5—5 of FIG. 4.

Heading angle changes of vehicle travel are obtained from a directional, self-erecting gyroscope 115 (FIGS. 4 and 5). Because of frequent $\theta$ SET steps in the program, incremental changes in heading angle are used rather than reading heading angle directly from the gyroscope 115. An azimuth shaft 111 of the gyroscope 115 carries a disk 113 perforated by 32 equally spaced holes 114 with a space 114' between each pair of the holes 114 equal in length to the diameter of the hole 114. An incandescent lamp 116 is located on one side of the disk 113, and a mask 118, having a pair of spaced openings 120 and 122, covers two photo-conductive photocells CL1, CL2 on the opposite side of the disk 113 so that the following sequence takes place during rotation of the disk between one hole 114 and the next:

| Motion of Disc | Cell CL1 | Cell CL2 |
|---|---|---|
| First quarter motion | dark | dark |
| Second quarter motion | illuminated | dark |
| Third quarter motion | illuminated | illuminated |
| Fourth quarter motion | dark | illuminated |

This sequence is achieved by making the mask openings 120, 122 over the respective cells half the size of the hole 114 or the space 114' and suitably spacing the two cells CL1, CL2 apart. The sequence repeats as the disk 113 rotates in one direction and reverses when the disk 113 rotates in the opposite direction. One terminal of each cell is grounded and the other terminal is connected to points CL1' and CL2' respectively (FIG. 6). An amplifier 124 is connected to each of these points to produce corresponding amplified signals of standard digital logic levels which are applied to a plurality of parallel connected gates 123 via a respective differentiating circuit 127.

It will be observed that the sequence of cell operation involves change of only one cell's illumination per step (one quarter of the space between hole centers). By gating the condition of the unchanged cell with the differentiated output of the other cell each incremental rotation may be detected. The four steps in one turning direction (RIGHT) are combined in the gates 123 to give an output dR and the four steps in the other turning direction (LEFT) are combined in the gates 123 to give an output dL. These output signals respectively set and reset a flip-flop 132 whose outputs LEFT or RIGHT indicate the direction of rotation of the gyroscope 115 and hence the last heading change. Either direction change sets a flip-flop 134. Photocells CL1 and CL2 associated with the gyroscope 115 are continuously observed for changes in illumination in accordance with the sequence stated above.

The program tape 100 (FIG. 2) is conventionally read optically by illuminating the channels or tracks TR1, TR3, TR5 and TR7 at one side of the tape 100 with a respective lamp 136 and sensing the light by a respective photoconductive photocell 138 located on the opposite side of the tape 100 whenever a hole in the tape 100 passes over the light. Each of the cells 138 is connected to a respective amplifier 139 which in turn is connected to a circuit terminal 140 (FIG. 6).

The tape motion and reading are controlled by the Johnson type counter 150 which has three counter stages designated T1, T2, T3 and has a 6-count cycle with major conditions at each count stated in the following table where 0 and 1 represent the logical state of each stage:

| Count | T3 | T2 | T1 | Major Use |
|---|---|---|---|---|
| No. 1 | 0 | 0 | 1 | Advance No. 1 |
| No. 2 | 0 | 1 | 1 | Clear and Tape Step No. 1 |
| No. 3 | 1 | 1 | 1 | Strobe |
| No. 4 | 1 | 1 | 0 | Advance No. 2 |
| No. 5 | 1 | 0 | 0 | Tape Step No. 2 |
| No. 6 | 0 | 0 | 0 | Ready |

When the count No. 6 is reached, a multivabrator 152 which steps the counter 150 is locked into a static state and the cycle does not repeat until an external signal sets the counter stage T1 to the logic 1 state.

The anti-hijacking system is housed in an enclosure having a door (not shown) provided with an interlock switch 154 which connects a DC voltage to the counter stage T1 via a circuit terminal 155 and this sets and keeps the stage T1 at logic 1 when the interlock switch 154 is closed by opening the enclosure door. The multivibrator 152 then causes the counter 150 to advance to counts No. 2 and No. 3 if not already there, but no further since stage T1 cannot reset. When the tape 100 is mounted in a tape reader 102 (FIG. 2) the dispatcher of the vehicle containing the system presses a RESET button 156. The generates a RESET SWITCH signal at a circuit terminal 158 which serves to reset various components. When this signal is applied as a logic 1 to a pair of parallel coupled gates 160, a CLEAR signal becomes logic 0 and is used to reset a plurality of flip-flops R1A, R3A, R5A and R7A. The RESET SWITCH signal is also applied to a flip-flop 161 to generate a READY signal which sets a flip-flop 162.

When the enclosure door is subsequently closed, the interlock switch 154 is opened and the counter 150 is permitted to step beyond count No. 3. However, the output of the flip-flop 162 sets the counter stage T2 whenever the counter stage T1 is at logic 1 so that count No. 2 is generated almost immediately after count No. 1 without waiting for the multivibrator 152 to cycle. Further, the counter cycle repeats, since the stage T1 is set to logic 1 by a gate 164 and by a signal C15 from a gate 165 which occurs about 0.6 milliseconds after count No. 6 is reached by the counter 150. Normally, during each ADVANCE step, a tape advance solenoid 163 in the tape reader 102 is energized and the tape 100 is stepped at the next count when the solenoid 163 is released. However, when the ADVANCE No. 1 step is made extremely short as mentioned above, the solenoid current does not have time to build up and thus tape movement takes place only once at count No. 5 per count cycle. Such stepping movement continues automatically until a hole 100' (FIG. 2) is reached in channel TR1 of tape 100, which corresponds to the first program step and is always a DROP POINT. This causes a flip-flop R1A to set during Count No. 3 when the STROBE signal is passed by a gate 167 connected to the counter stage T1. A pulse A0 is generated during count No. 6 and is gated through a gate 169 by flip-flop R1A to reset the flip-flop 162. Meanwhile, the tape has moved to the next line at count No. 5, where the contents appear as signals R1B, R3B, R5B and R7B at the flip-flops R1A, R3A, R5A and R7A respectively.

This is the proper condition for start of the run, the first instruction having been read and the multivibrator 152 being locked with the counter 150 staying at count No. 6. After this initial stepping of the tape 100 through its leader, the counter stage T2 is no longer forced to follow the stage T1 and count No. 1 is of sufficient duration to energize the solenoid 163 of the tape reader so that the tape 100 steps twice per count cycle. At count No. 2 the flip-flops R1A, R3A, R5A and R7A are reset by the CLEAR signal from the gate 160, while the release of the solenoid 163 actuated by the ADVANCE signal passed by the gates 168 during count No. 1 steps the tape 100. At count No. 3, the STROBE signal sets the flip-flops R1A-R7A in accordance with the function punched in the tape. The solenoid 163 is again energized during count No. 4 and the tape steps to the next line at count No. 5. During count No. 6, signals R1B, R3B, R5B and R7B correspond to the holes punched in the second line of the tape and thus represent the numerical quantity corresponding to the function coded in the flip-flops R1A through R7A.

During the READY state, a counter 170 which has three stages J1, J2, J3 is stepped by a multivibrator 172 which has been locked static during the preceding steps. Signals CA, CB and CC are generated by gates 174, 176, 178 connected to the several stages J1-J3 of the counter 170. The Ripple counter 180 which has four stages K1, K2, K3, K4 is stepped during the count between signals CC and CA by a gate 179 whose input includes the output from the multivibrator 172 so as to make the Ripple counter 180 step about midway of the step of the counter 170 thus avoiding possible "race" conditions in subsequent gating between the two counters.

A 1 of 16 decoder 182 converts the outputs of the four Ripple counter stages K1-K4 into a succession of sixteen pulses. A number of these pulses are inverted by a respective inverter 184 to logic 1 signals S1-S4. Others are gated by pulses CA, CB and CC at respective gates 185 to create narrower, noninterfering pulses A0, A1, A8, A12, A13, B15, C15 etc., where the numeral after the letter A, B or C represents the step number. One pulse is gated to give the AB13 pulse which occurs between CA and CB times during step No. 13. These signals serve to synchronize the various operations taking place during the READY period. It will be noted that the READY flip-flop 161 is reset at the end of the last clock by signal dc15 differentiated by a differentiator 183. Then this reset locks the multivibrator 172 via a gate 187 so that the timing clock signals begin with pulse A0 when the READY flip-flop 161 is again set. Thus the READY stage synchronizes fully with the clock pulses. There is an integral number of clock pulses during the time that the READY signal is at logic 1.

When a θ SET function is read from the tape 100 and the program counter 150 next reaches READY, a flip-flop 184 is set and its output is gated at a gate 186 by signals from the flip-flops R3A and R7A representing this type of function to create the θ SET signal which in turn permits the CC portion of each clock time to shift an 8 stage θ register 188. At the same time a terminal DS of the register 188 is energized blocking inputs at a terminal DO and allowing signals at a terminal D1 to enter. The outputs are simultaneously blocked at gates 190 and 192 to prevent possible disturbance of other circuits by changes in the signal output S180 of a flip-flop 191. A flip-flop 193 is reset by the C7 clock pulse and thus its output to the flip-flop 184 lasts for the first eight clock times (0 through 7). The programmed angle given by signals R1B, R3B, R5B and R7B from the flip-flops R1A–R7A, is gated at a plurality of gates 195 by clock timing pulses S1, S2, S3 and S4, and is fed directly or as in inverse dependent upon whether it is a RIGHT or LEFT θ SET (as indicated by the absence or presence of the R1A signal on the tape 100, by the gates 194) to input D1 of the shift register 188. The net result is to enter the programmed data into the shift register 188, with its previous contents erased. At the same time the θ SET signal passing through an inverter 196 sets counter stage T1 thus terminating the READY step after a single clock cycle and advancing the tape 100 to the next function.

After a bias angle has been stored in the θ register 188, changes in vehicle heading modify the register contents by adding or subtracting unity at each change, depending upon its direction. This is accomplished by serially adding a 1 or subtracting a 1 while the register 188 is shifted cyclicly. Considering that the register output goes from the least significant bit to the most significant bit during shift, addition of logic 1 is accomplished by inverting bits until a 1 is generated. Subtraction of logic 1 is accomplished by inverting bits until a 0 is generated. Since only seven bits are needed for the angle, the least significant bit in the θ register 188 is unused and ignored. Inversion thus starts with the next bit which is position No. 1 in the register 188.

When the flip-flop 134 is set by a RIGHT or LEFT heading change, it sets a Δ H flip-flop 200 at time Δ O through a gate 202. The Δ H flip-flop 200 is reset at C7 time and thus remains set for exactly the 8 clock times (0 through 7). When the H flip-flop 200 resets in turn, it resets the flip-flop 134. The H signal permits CC pulses to shift the θ register 188. Since the input DS is now at 0, the output S180 from the flip-flop 191 enters the register 188 during shift (at terminal DO). A flip-flop 204 is set by clock A1 and this gates the inverted output of the θ register 188 to the set line of a flip-flop 206 which is reset at the beginning of each CB pulse via a gate 208 and differentiator 209 so that it assumes the state of the inverse of the register output (S180) during CB time. When the result is a 1 and the change is to the RIGHT, the flip-flop 204 is reset at CC time by a gate 212, and when the result is a 0 and the change is to the LEFT, the flip-flop 204 is reset by a gate 214, the remaining bits being recirculated without inversion. At the end of the shift, therefore, the contents of the θ register 188 have been increased or decreased by unity depending upon whether the change in heading was to the right or to the left.

A flip-flop 193 inserts tape data into a D TAPE register 216 in the same way as described for the θ register 188, but for all program functions since its output is used directly in this case, not subject to gating by any set of R signals. The fact that angle information is inserted into the D TAPE register 216 during θ SET functions is immaterial since, very shortly after, another function will be read and the corresponding distance will be read in instead. This distance is always entered as the complement of the program distance so that, when the contents of the D TAPE register 216 are incremented in accord with vehicle motion, an overflow will occur at the program distance. Furthermore, the entry represents the four most significant bits, although entered into positions No. 1 through No. 4 of the register. As will be seen, incrementation takes place with the register shifting the eight clock times from count No. 8 through count No. 15 so that the least-significant bit corresponds, during shift, to clock time No. 13.

A flip-flop 125 which goes through a set and reset each 5.28 feet of vehicle motion, in turn, operates a J–K flip-flop 218 at half this rate, thus cycling each 10.56 feet. When the output of the flip-flop 218 is at logic 0, it sets an auxiliary flip-flop 220. Then, when it becomes logic 1, it sets another flip-flop 222 at time A8. The output of the flip-flop 222 resets the auxiliary flip-flop 220 at time B15, preventing further action until the flip-flop 218 is again reset. A flip-flop 224 is reset at time C15 so that it remains set for the eight clock times No. 8 through 15. Its output permits shift of the D TAPE register 216.

Since distance is never taken as negative, the D TAPE register 216 recirculation does not need any subtract circuit. Thus inversion starts at the least-significant bit by setting a flip-flop 226 by the clock signal AB13. It stops when a logic 1 is generated at a flip-flop 230 during shift. An overflow is indicated by the fact that the inverting flip-flop 226 is never reset. This is detected by examining its condition at A13 time. Because of the fact that, as here implemented, the add 1 function is partially carried out in one shift cycle and is not completed until the next shift cycle which need not occur until some subsequent period, such examination is only valid during a shift cycle. The STEP signal, indicating overflow, therefore consists of the output of the flip-flop 230 gated by the shift signal and this is then gated by pulse A13 via a gate 232 to cause tape advance by setting counter stage T1.

A D TURN register 240 records distance moved during a turn. It is also used to measure the distance allowed after a STOP TRUCK display is illuminated before the vehicle is disabled and an alarm is sounded. During shift of the θ register 188, the S180 signal at time C5 indicates the presence of a 1 corresponding to 45° and at time C6 corresponding to 90°. These conditions are remembered by two flip-flops 242, 244 (6E) which are reset at the start of each shift. When both of these are reset, the angle magnitude is either between 0° and 45° or between 180° and 225° (−135° and —180°). When both are set, the angle is either between 315° and 360° (0° and —45°) or between 135° and 180°. The inverse of these indicates the conditions for positive or negative turn distance accumulation according as the 180 signal is 0 or 1 (after shift) respectively. Combined, there results the D TURN ENABLE signal which shifts the D TURN register 240 via a gate 244 at each 10.56 feet of vehicle motion. The register is cleared by the preceding θ SET signal and has no other initial value set in. It does have both add 1 and subtract 1 facilities during shift, the direction depending upon the state of the S180 signal.

A count of 16 on the D TURN register 240 denotes 168.96 feet corresponding to a short turn and a count of 32 represents twice this distance, thus corresponding to a long turn. Whether negative or positive, the count of 16 is indicated by a non-reset of flip-flop 245 at the fourth bit (clock time No. 12) and the count of 32 by non-shift at clock time No. 13. To prevent false indications during man-shift periods, the flip-flop 245 is set at the start of a shift cycle only using differentiation by a differentiator 246 of the enabling signal at 244.

The error determination as indicated by the creation of the STOP TRUCK signal by setting a flip-flop 250 will not be explained. On a programmed NO TURN step, the NO TURN signal is generated by suitable decode of a tape code gate 256. If either a right or left short turn occurs during this function, a MADE TURN flip-flop 248 is set by the gate 256. The output of the flip-flop 248 is examined at time A1 and gated by the NO TURN function to set the STOP TRUCK flip-flop 250. If a "U" turn has taken place, this is detected by a gate 258 which cause setting of the STOP TRUCK flip-flop 250 if the θ register 188 indicates an angle between 135° and 225° during a NO TURN program.

On a programmed short turn, a gate 260 is energized paralleling the NO TURN signal and setting the MADE TURN flip-flop 248 if a short turn has occurred. If the direction of the turn (as indicated by the state of the 180 signal) agrees with the programmed direction (indicated by the state of the R1A signal), a CONTINUE flop 262 is set which, at time pulse C15, actuates a gate 264 setting T1 and thus indicating the next tape advance. On the other hand, if the direction of turn is opposite to that programmed, a gate 266 sets the STOP TRUCK flip-flop 250 to indicate error. Finally if a turn has not been made within the specified distance, the STEP signal at a gate 268 gated by pulse A13 initiates the tape stepping cycle while the flip-flop 248 is in the reset state and thus the CONTINUE flip-flop 262 is not set either. If the next program function is a continuation of the turn for an additional distance, further waiting for a turn occurs but, if the next program function is a θ SET (mandatory following a turn function), a gate 270 sets the STOP TRUCK flip-flop 250 at time C5, indicating error. Because of the timing and the fact that the θ SET signal is present only for eight clock times, this signal in the gate 270 cannot be the same as the one in a gate 272 which resets the CONTINUE flip-flop 262. The latter corresponds to the θ SET function which must precede every programmed turn. Operation on a programmed long turn is substantially identical. On a NO TURN or ANY TURN function, a gate 280 with inputs R5A and R7A sets the CONTINUE flip-flop 262 so as to prevent an erroneous STOP TRUCK setting by a succeeding θ SET signal. The R7A input will, in these cases, prevent setting of counter stage T1 by the gate 264.

The first DROP POINT function, being the first code punched into the tape, is preceded by RESET which initially resets the CONTINUE flip-flop 262. Subsequent DROP POINT functions must be preceded by θ SET functions to insure that the CONTINUE flip-flop 262 is reset. If then, the programmed distance for the DROP POINT is used up before a START button 290 is pressed, the CONTINUE flip-flop 262 remains reset when the θ SET function following the DROP POINT is signalled and the STOP TRUCK flip-flop 250 will be set to indicate an error. If the START button 290 is pressed in time, a gate 292 will set the CONTINUE flip-flop 262. This will, in turn, actuate the gate 264 and initiate tape movement to the next program stop.

It will be apparent from the foregoing description that the system follows a program controlled by the punched tape 100 in tape reader 102. Right and left turns and drop points in the route are monitored, and deviations from the programmed turns immediately actuate the alarm apparatus and vehicle disabling means associated with the system. The accumulation of errors such as occurs with systems which monitor a route continuously at all points, is avoided. Conventional alarm apparatus and vehicle disabling means can be employed and thus are not described herein.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:

1. A system for determining deviations of a vehicle from a prescribed route, comprising;
    tape storage means having data representing each of the turning points of a prescribed route to be travelled by said vehicle;
    data reading means for reading off said data at each of said turning point of said route and arranged to generate first data signals corresponding to data read from the said tape storage means;
    position determining means carried by said vehicle for detecting angular changes in heading of the vehicle at each of said turning points, and arranged to generate second data signals corresponding to said changes in heading;
    comparison means comprising a data signal comparison means arranged to receive said first and second data signals for comparing the same and signal generating means in circuit with said data signal comparison means for generating signals indicative of coincidence and noncoincidence of the compared data signals; and
    advance means for moving said tape storage means after said comparison means indicates coincidence and for holding said storage means stationary when said vehicle is traveling between said turning points.

2. A system as defined in claim 1 further comprising reset means for setting said comparison means to zero upon the generation of a coincidence signal by said signal generating means.

3. A system as defined in claim 1, further comprising; distance measuring means carried by said vehicle for measuring distances travelled by the vehicle on said route, and arranged to generate third data signals representing said distances;

and circuit means receptive to said second and third data signals and arranged to suppress those data signals representing minor deviations in heading of the vehicle from the prescribed points in said route.

4. A system as defined in claim 3 wherein said comparison means comprises a digital counting, register and decoding means responsive to receipt of said first, second and third data signals for counting the steps of said program, and for generating the signals indicative of coincidence and non-coincidence of said compared data signals.

5. A system as defined in claim 1 further including disabling means for disabling said vehicle upon the generation of said noncoincidence signal by said comparison means.

6. A system as defined in claim 1 wherein said tape storage means comprises a tape having a plurality of parallel channels punched with coded impressions representative of said turning points in said route.

7. A system as defined in claim 6 wherein said data reading means comprises a scanning means arranged to scan said impressions and generate said first data signals.

8. A system as defined in claim 6 wherein said impressions comprise a plurality of array of holes.

9. A system as defined in claim 3, wherein said distance measuring means comprises a rotating odometer cable; a magnet carried by said cable; and a magnetic switch means operable by said magnet and connected to said circuit to provide signals representative of distances travelled by said vehicle between said turning points and around said turns.

10. A system as defined in claim 1, wherein said position determining means comprises a directional self-erecting gyroscope.

* * * * *